United States Patent
Macchi et al.

(10) Patent No.: US 11,740,145 B2
(45) Date of Patent: Aug. 29, 2023

(54) METHODS AND DEVICES FOR ESTIMATING RESIDUAL TORQUE BETWEEN THE BRAKED AND BRAKING ELEMENTS OF A VEHICLE

(71) Applicant: ITT Italia S.r.l., Barge (IT)

(72) Inventors: Pietro Roberto Macchi, Turin (IT); Umberto Vignolo, Porte (IT); Marco Terranova, Turin (IT); Stefano Serra, Saluzzo (IT)

(73) Assignee: ITT Italia S.r.l., Barge (IT)

( * ) Notice: Subject to any disclaimer, the term of this patent is extended or adjusted under 35 U.S.C. 154(b) by 0 days.

(21) Appl. No.: 17/751,439

(22) Filed: May 23, 2022

(65) Prior Publication Data

US 2022/0381631 A1 Dec. 1, 2022

(30) Foreign Application Priority Data

May 25, 2021 (IT) .................. 102021000013529

(51) Int. Cl.
  *G01L 3/16* (2006.01)
  *G01L 5/28* (2006.01)
(52) U.S. Cl.
  CPC . *G01L 3/16* (2013.01); *G01L 5/28* (2013.01)
(58) Field of Classification Search
  CPC ... G01L 3/16; G01L 5/28; B60T 17/00; B60T 17/221
  See application file for complete search history.

(56) References Cited

U.S. PATENT DOCUMENTS

| 2,117,027 A | 5/1938 | Langbein |
| 2,289,954 A | 7/1942 | Arndt |
| 3,689,880 A | 9/1972 | McKee et al. |
| 3,724,916 A | 4/1973 | Hirzel |
| 3,902,157 A | 8/1975 | Kita et al. |
| 4,023,864 A | 5/1977 | Lang et al. |
| 4,117,451 A | 9/1978 | Sato et al. |
| 4,298,857 A | 11/1981 | Robins et al. |
| 4,456,098 A | 6/1984 | Lindre |
| 4,484,280 A | 11/1984 | Brugger et al. |

(Continued)

FOREIGN PATENT DOCUMENTS

| CN | 1678893 | 10/2005 |
| CN | 102317130 | 1/2012 |

(Continued)

OTHER PUBLICATIONS

European Search Report; European Application No. EP 14158449; dated Aug. 6, 2014.

(Continued)

*Primary Examiner* — Freddie Kirkland, III
(74) *Attorney, Agent, or Firm* — Knobbe Martens Olson & Bear LLP

(57) ABSTRACT

Methods and devices for estimating a residual torque between the braked (e.g., brake disk or drum) and braking elements (e.g., support plate or friction block) of a vehicle based on acquired and reference temperatures, where the reference temperature can be calculated using an N-dimensional calculation model with an N-dimensional vector of input variables, and where said N-dimensional calculation model can be an analytical or experimental characterization of the thermal behavior of the brake.

20 Claims, 6 Drawing Sheets

(56) References Cited

U.S. PATENT DOCUMENTS

| | | |
|---|---|---|
| 4,495,434 A | 1/1985 | Diepers et al. |
| 4,602,702 A | 7/1986 | Ohta et al. |
| 4,623,044 A | 11/1986 | Ohta et al. |
| 4,649,370 A | 3/1987 | Thomason |
| 4,782,319 A | 11/1988 | Dell'Acqua et al. |
| 4,854,424 A | 8/1989 | Yamatoh et al. |
| 4,869,350 A | 9/1989 | Fargier et al. |
| 4,901,055 A | 2/1990 | Rosenberg et al. |
| 4,928,030 A | 5/1990 | Culp |
| 5,090,518 A | 2/1992 | Schenk et al. |
| 5,099,962 A | 3/1992 | Furusu et al. |
| 5,115,162 A | 5/1992 | Leonard et al. |
| 5,133,431 A | 7/1992 | Braun |
| 5,176,034 A | 1/1993 | Hazony et al. |
| 5,235,135 A | 8/1993 | Knecht et al. |
| 5,302,940 A | 4/1994 | Chen |
| 5,325,011 A | 6/1994 | Kahn |
| 5,404,067 A | 4/1995 | Stein |
| 5,406,682 A | 4/1995 | Zimnicki et al. |
| 5,416,415 A | 5/1995 | Dorri et al. |
| 5,419,415 A | 5/1995 | Lamb et al. |
| 5,660,215 A | 8/1997 | Nishikawa et al. |
| 5,719,577 A | 2/1998 | Pitot et al. |
| 5,839,545 A | 11/1998 | Preston et al. |
| 6,064,970 A | 5/2000 | McMillan et al. |
| 6,122,585 A | 9/2000 | Ono et al. |
| 6,179,091 B1 | 1/2001 | Takanashi |
| 6,204,786 B1 | 3/2001 | Bieth et al. |
| 6,247,560 B1 | 6/2001 | Bunker |
| 6,310,545 B1 | 10/2001 | Sapir |
| 6,339,956 B1 | 1/2002 | Huinink et al. |
| 6,345,225 B1 | 2/2002 | Bohm et al. |
| 6,414,818 B1 | 7/2002 | Tanimoto |
| 6,477,893 B1 | 11/2002 | Djordjevic |
| 6,529,803 B2 | 3/2003 | Meyers et al. |
| 6,549,126 B2 | 4/2003 | Hageman et al. |
| 6,612,736 B2 | 9/2003 | Lee et al. |
| 6,668,983 B2 | 12/2003 | Drennen et al. |
| 6,681,631 B2 | 1/2004 | Apel |
| 6,813,581 B1 | 11/2004 | Snyder |
| 6,823,242 B1 | 11/2004 | Ralph |
| 6,934,618 B2 | 8/2005 | Eckert et al. |
| 7,124,639 B1 | 10/2006 | Kurtz et al. |
| 7,127,948 B2 | 10/2006 | Tavares et al. |
| 7,331,427 B2 | 2/2008 | Mohr |
| 7,451,653 B1 | 11/2008 | Sippola |
| 7,694,555 B2 | 4/2010 | Howell et al. |
| 8,026,802 B2 | 9/2011 | Shimura |
| 8,066,339 B2 * | 11/2011 | Crombez .............. B60T 8/00 303/152 |
| 8,151,944 B2 * | 4/2012 | Waltz ............ B60T 17/221 188/1.11 E |
| 8,287,055 B2 | 10/2012 | Lee |
| 8,310,356 B2 | 11/2012 | Evans et al. |
| 8,437,934 B2 | 5/2013 | Degenstein |
| 8,573,045 B2 | 11/2013 | Gotschlich |
| 8,676,721 B2 | 3/2014 | Piovesan et al. |
| 8,717,158 B2 | 5/2014 | Roach |
| 8,729,938 B2 | 5/2014 | Watanabe |
| 8,789,896 B2 | 7/2014 | Albright et al. |
| 8,958,966 B2 | 2/2015 | Nohira et al. |
| 9,187,099 B2 | 11/2015 | Powers et al. |
| 9,269,202 B2 | 2/2016 | Phelan et al. |
| 9,286,736 B2 | 3/2016 | Punjabi et al. |
| 9,316,278 B2 | 4/2016 | Moore et al. |
| 9,353,815 B1 | 5/2016 | Eden |
| 9,415,757 B2 | 8/2016 | Martinotto et al. |
| 9,635,467 B2 | 4/2017 | Miyoshi et al. |
| 9,827,961 B2 | 11/2017 | Spieker et al. |
| 9,939,035 B2 | 4/2018 | Donzelli et al. |
| 9,964,167 B2 | 5/2018 | Martinotto et al. |
| 9,988,024 B2 | 6/2018 | Schwartz et al. |
| 10,052,957 B2 | 8/2018 | Azzi |
| 10,119,586 B2 * | 11/2018 | Merlo .................. F16D 69/00 |
| 10,138,968 B2 | 11/2018 | Serra et al. |
| 10,208,822 B2 | 2/2019 | Donzelli et al. |
| 10,224,128 B2 | 3/2019 | Lee |
| 10,227,064 B2 | 3/2019 | Serra et al. |
| 10,295,006 B2 | 5/2019 | Serra et al. |
| 10,408,292 B2 | 9/2019 | Donzelli et al. |
| 10,451,130 B2 | 10/2019 | Solari et al. |
| 10,495,168 B2 | 12/2019 | Serra et al. |
| 10,598,239 B2 | 3/2020 | Martinotto et al. |
| 10,677,304 B2 | 6/2020 | Donzelli et al. |
| 10,955,017 B2 | 3/2021 | Serra et al. |
| 11,047,440 B2 | 6/2021 | Serra et al. |
| 2001/0042661 A1 | 11/2001 | Treyde |
| 2001/0049577 A1 | 12/2001 | Kesselgruber |
| 2002/0047496 A1 | 4/2002 | Wierach |
| 2002/0095253 A1 | 7/2002 | Losey et al. |
| 2002/0104717 A1 | 8/2002 | Borugian |
| 2003/0111305 A1 | 6/2003 | Drennen et al. |
| 2004/0015283 A1 | 1/2004 | Eckert et al. |
| 2004/0041464 A1 | 3/2004 | Eckert et al. |
| 2004/0187591 A1 | 9/2004 | Baumann et al. |
| 2004/0238299 A1 | 12/2004 | Ralea et al. |
| 2004/0242803 A1 | 12/2004 | Ohme et al. |
| 2005/0029056 A1 | 2/2005 | Baumgartner et al. |
| 2005/0103580 A1 | 5/2005 | Kramer |
| 2005/0236104 A1 | 10/2005 | Tanaka |
| 2005/0251306 A1 | 11/2005 | Gowan et al. |
| 2006/0016055 A1 | 1/2006 | Wilkie et al. |
| 2006/0076196 A1 | 4/2006 | Palladino |
| 2006/0254868 A1 | 11/2006 | Thiesing et al. |
| 2007/0024113 A1 | 2/2007 | Thrush |
| 2007/0228824 A1 | 10/2007 | Yasukawa et al. |
| 2007/0235268 A1 | 10/2007 | Caron |
| 2007/0284713 A1 | 12/2007 | Ninomiya et al. |
| 2008/0246335 A1 | 10/2008 | Spieker et al. |
| 2009/0033146 A1 | 2/2009 | Rieth et al. |
| 2009/0133971 A1 | 5/2009 | Baier-Welt |
| 2009/0157358 A1 | 6/2009 | Kim |
| 2009/0187324 A1 | 7/2009 | Lu et al. |
| 2009/0218179 A1 | 9/2009 | Yokoyama et al. |
| 2009/0223282 A1 | 9/2009 | Yamazaki |
| 2009/0289529 A1 | 11/2009 | Ito |
| 2009/0296945 A1 * | 12/2009 | Attia .................. G01M 17/007 381/56 |
| 2010/0032898 A1 | 2/2010 | Gearty |
| 2010/0186938 A1 | 7/2010 | Murata et al. |
| 2010/0210745 A1 | 8/2010 | McDaniel |
| 2010/0211249 A1 | 8/2010 | McClellan |
| 2010/0250081 A1 | 9/2010 | Kinser et al. |
| 2010/0318258 A1 | 12/2010 | Katayama et al. |
| 2011/0050406 A1 | 3/2011 | Hennig et al. |
| 2011/0125381 A1 | 5/2011 | Szell et al. |
| 2012/0055257 A1 | 3/2012 | Shaw-Klein |
| 2013/0013348 A1 | 1/2013 | Ling et al. |
| 2013/0018266 A1 | 1/2013 | Nishikubo |
| 2013/0048443 A1 | 2/2013 | Muramatsu et al. |
| 2013/0192933 A1 | 8/2013 | King et al. |
| 2014/0097951 A1 | 4/2014 | Grgic |
| 2014/0200784 A1 | 7/2014 | Nohira et al. |
| 2014/0257605 A1 | 9/2014 | Beck et al. |
| 2014/0311833 A1 | 10/2014 | Martinotto et al. |
| 2014/0337086 A1 | 11/2014 | Asenjo et al. |
| 2015/0112515 A1 | 4/2015 | Conway |
| 2016/0014526 A1 | 1/2016 | Miyoshi et al. |
| 2016/0084331 A1 | 3/2016 | Merlo et al. |
| 2016/0146279 A1 | 5/2016 | Philpott |
| 2016/0272176 A1 | 9/2016 | Furuyama |
| 2016/0341622 A1 | 11/2016 | Mensa |
| 2017/0052028 A1 | 2/2017 | Choudhury et al. |
| 2017/0082165 A1 | 3/2017 | Donzelli et al. |
| 2017/0082167 A1 | 3/2017 | Serra et al. |
| 2017/0267220 A1 | 9/2017 | Serra et al. |
| 2017/0331030 A1 | 11/2017 | Inoue et al. |
| 2018/0106319 A1 | 4/2018 | Solari et al. |
| 2018/0160248 A1 | 6/2018 | Murakami et al. |
| 2018/0244159 A1 | 8/2018 | Satterthwaite et al. |
| 2019/0003541 A1 | 1/2019 | Serra et al. |
| 2019/0005743 A1 | 1/2019 | Serra et al. |
| 2019/0078630 A1 | 3/2019 | Serra et al. |
| 2019/0241166 A1 | 8/2019 | Serra et al. |

(56) References Cited

U.S. PATENT DOCUMENTS

| | | |
|---|---|---|
| 2019/0249736 A1 | 8/2019 | Donzelli et al. |
| 2019/0351889 A1 | 11/2019 | Serra et al. |
| 2020/0088256 A1 | 3/2020 | Solari et al. |
| 2020/0124124 A1 | 4/2020 | Serra et al. |
| 2021/0071728 A1 | 3/2021 | Serra et al. |
| 2021/0148427 A1 | 5/2021 | Martinotto et al. |
| 2021/0348666 A1 | 11/2021 | Serra et al. |
| 2021/0388878 A1 | 12/2021 | Serra et al. |
| 2022/0176826 A1* | 6/2022 | Cho .......................... B60L 7/26 |

FOREIGN PATENT DOCUMENTS

| | | |
|---|---|---|
| CN | 102658812 | 9/2012 |
| CN | 102785648 | 11/2012 |
| CN | 104813060 | 2/2018 |
| CN | 104821372 | 6/2018 |
| DE | 10006012 | 9/2000 |
| DE | 10230008 | 1/2004 |
| DE | 10243127 | 3/2004 |
| DE | 10259629 | 7/2004 |
| DE | 102005052630 | 3/2007 |
| DE | 102006018952 | 10/2007 |
| DE | 102006053489 | 5/2008 |
| DE | 102010010482 | 8/2011 |
| DE | 102011006002 | 9/2012 |
| DE | 10-2012-007118 | 10/2013 |
| EP | 0189076 | 7/1986 |
| EP | 0601681 | 6/1995 |
| EP | 0744558 | 11/1996 |
| EP | 0781936 | 7/1997 |
| EP | 1431606 | 6/2004 |
| EP | 1530037 | 5/2005 |
| EP | 1531110 | 5/2005 |
| EP | 1923592 | 5/2008 |
| EP | 2647866 | 10/2013 |
| EP | 2741063 | 6/2014 |
| EP | 2778462 | 9/2014 |
| EP | 2570691 | 10/2014 |
| EP | 1173687 | 1/2022 |
| FR | 2815040 | 4/2002 |
| GB | 2309057 | 7/1997 |
| GB | 2372825 | 9/2002 |
| GB | 2478423 | 9/2011 |
| JP | S57-011143 | 1/1982 |
| JP | S58-206458 | 12/1983 |
| JP | S61275049 | 12/1986 |
| JP | 04-054326 | 2/1992 |
| JP | H07-002107 | 1/1995 |
| JP | H09-002240 | 1/1997 |
| JP | H11-94707 | 4/1999 |
| JP | H11-125285 | 5/1999 |
| JP | 2002-130348 | 5/2002 |
| JP | 2002-538039 | 11/2002 |
| JP | 2003-104139 | 4/2003 |
| JP | 2003-205833 | 7/2003 |
| JP | 2005-035344 | 2/2005 |
| JP | 2006-193091 | 7/2006 |
| JP | 2007-224988 | 9/2007 |
| JP | 2011-116237 | 6/2011 |
| JP | 2012-202983 | 10/2012 |
| JP | 2016-516631 | 6/2016 |
| JP | 2016-521336 | 7/2016 |
| KR | 10-2002-0051429 | 6/2002 |
| KR | 10-2007-0027041 | 3/2007 |
| KR | 10-0791632 | 12/2007 |
| KR | 2009-0057640 | 6/2009 |
| KR | 10-2004-48957 | 6/2010 |
| KR | 2011-0043849 | 4/2011 |
| KR | 10-2013-0039804 | 4/2013 |
| KR | 10-2015-0045047 | 4/2015 |
| KR | 10-2016-0174510 | 12/2016 |
| KR | 10-2015-0143696 | 12/2019 |
| WO | WO 1999/08018 | 2/1999 |
| WO | WO 2004/027433 | 4/2004 |
| WO | WO 2014/170726 | 10/2014 |
| WO | WO 2014/170849 | 10/2014 |
| WO | WO 2015/013217 | 1/2015 |
| WO | WO 2016/038533 | 3/2016 |
| WO | WO 2016/189150 | 12/2016 |
| WO | WO 2018/019438 | 2/2018 |
| WO | WO 2019/171289 | 9/2019 |

OTHER PUBLICATIONS

International Search Report; International Application No. PCT/IB2013/060881; dated Jul. 3, 2014.
International Search Report; International Application No. PCT/IB2014/060778; dated Aug. 6, 2014.
International Search Report; International Application No. PCT/IB2015/056861; dated Jan. 18, 2016.
International Search Report in PCT Application No. PCT/EP2016/071865 dated Dec. 13, 2016 in 3 pages.
International Search Report and Written Opinion; International Application No. PCT/EP2017/059238; dated Aug. 10, 2017.
Chinese Office Action in Chinese Application No. 201680054121.1 dated Mar. 26, 2019, in 9 pages.
Chinese Office Action in Chinese Application No. 201680054121.1 dated Feb. 3, 2020, in 8 pages.
Chinese Office Action in Chinese Application No. 201680054121.1 dated Nov. 4, 2020, in 8 pages.
Chinese Office Action in Chinese Application No. 201680054121.1 dated Jan. 19, 2021, in 28 pages.
Chinese Office Action in Chinese Application No. 201780011871.5, dated Jun. 17, 2020, in 15 pages.
Chinese Search Report in Chinese Application No. 201780011871.5, dated Jun. 10, 2020, in 2 pages.
Chinese Office Action in Chinese Application No. 201980033093.9, dated Sep. 28, 2021, in 14 pages.
Chinese Office Action in Chinese Application No. 201980033093.9, dated Feb. 16, 2022, in 13 pages.
European Office Action in European Application No. 16770243.0 dated Oct. 15, 2019, in 5 pages.
European Office Action in European Application No. 16770243.0 dated Jan. 12, 2020, in 3 pages.
European Office Action in European Application No. 16770243.0 dated Jun. 23, 2020, in 5 pages.
Indian Office Action Indian Application No. 201837009364 dated Nov. 20, 2020, in 15 pages.
Official European Communication in European Application No. 16770243.0 dated Oct. 19, 2020, in 11 pages.
Written Opinion in PCT Application No. PCT/EP2016/071865 dated Dec. 13, 2020, in 6 pages.
Written Opinion in Japanese Application No. 2018513655 dated Oct. 12, 2020, in 4 pages.
Written Opinion in Japanese Application No. 2018-545192, dated Feb. 24, 2021, in 6 pages.
Written Amendment in Japanese Application No. 2018513655 dated Oct. 12, 2020, in 5 pages.
Office Action with English translation issued in Korean Application No. 10-2019-7004821, dated Feb. 10, 2021, in 18 pages.
Second Office Action with English translation in Chinese Application No. 201780045954.6, in 14 pages.
Search Report with English translation in Japanese Application No. JP 2019-503519, dated Dec. 10, 2020, in 22 pages.
Office Action with English translation in Japanese Application No. 2019-503519, dated Dec. 23, 2020, in 20 pages.
First Office Action with English translation in Chinese Application No. 201780045954.6, in 15 pages.
Japanese Written Amendment in Japanese Application No. 2018545192, dated Feb. 24, 2021, in 8 pages.
International Search Report and Written Opinion for Application No. PCT/EP2019/062680, dated Jun. 27, 2019, in 9 pages.
Italian Search Report for Italian Application No. IT 201800005484, dated Feb. 19, 2019, in 7 pages.
Italian Search Report and Written Opinion for Italian Patent Application No. IT UB20151059; dated May 28, 2015; 7 pages.
Italian Search Report and Written Opinion for ITTO 20130307; dated Mar. 7, 2014; 7 pages.

(56) References Cited

OTHER PUBLICATIONS

Italian Search Report Coversheet for Italian Patent Application No. 102015000018714/ITUB20151184; dated Jan. 26, 2016; 1 page.
Italian Search Report Coversheet for Italian Patent Application No. 102015000018748/ITUB20151291; dated Feb. 3, 2016; 1 page.
Italian Search Report Coversheet Italian Patent Application No. 102015000018701 ITUB20151029; dated Feb. 3, 2016; 1 page.
Italian Search Report for Italian Patent Application No. 102015000018771 (UB20151059); dated Jan. 27, 2016; 1 page.
Italian Search Report for Italian Patent Application No. IO 56568 It UB20151059; dated Jan. 20, 2016; 7 pages.
Italian Search Report for Italian Patent Application No. IO 56584/ITUB20151184; dated Jan. 14, 2016; 7 pages.
Italian Search Report for Italian Patent Application No. IO 56597/ITUB20151291; dated Jan. 25, 2016; 7 pages.
Italian Search Report Italian Patent Application No. IO 56565/ITUB20151029; dated Jan. 22, 2016; 8 pages.
Italian Search Report and Written Opinion for Italian Patent Application No. IT 201600077944 (IO 69013); dated May 26, 2017; 8 pages.
Japanese Office Action in Japanese Application No. 2018513655 dated Jul. 14, 2020, in 16 pages.
Japanese Office Action in Japanese Application No. 2018-545192, dated Jan. 5, 2021, in 17 pages.
Japanese Search Report in Japanese Application No. 2018513655 (0022000625) dated May 25, 2020, in 12 pages.
Von Wagner, et al., "Active Control of Brake Squeal Via 'Smart Pads'"; Oct. 10, 2004.
"The Next Generation of Hub Units"; SKF Group; 2012, www.vsm.skf.com; 32 pages.

Solyom, Stefan, et al.; "Synthesis of a Model-Based Tire Slip Controller"; 2004; Vehicle System Dynamics, pp. 475-499; http://dx.doi.org/10.1080/004231105123313868.
Gustafsson, Fredrik; "Slip-based Tire-Road Friction Estimation"; Automatica, 1997; vol. 33, No. 6; pp. 1087-1099.
Pasillas-Lepine, William; "Hybrid Modeling and Limit Cycle Analysis for a Class of Five-Phase Anti-Lock Brake Algorithms"; Feb. 1, 2006; vol. 44, No. 2; pp. 173-188.
Capra, D. et al.; An ABS Control Logic Based on Wheel Force Measurement. In: Vehicle System Dynamics; vol. 50, No. 12, pp. 1779-1796; http://porto.polito.it/2497487/.
Ait-Hammouda, Islam; "Jumps and Synchronization in Anti-Lock Brake Algorithms"; Oct. 2008, Japan, 7 pages; https://hal.archives-ouvertes.fr/hal-00525788.
Yi, Jingang; "Emergency Braking Control with an Observer-based Dynamic Tire/Rotation Friction Model and Wheel Angular Velocity Measurement"; Vehicle System Dynamics; 2003, vol. 39, No. 2; peg. 81-97.
Ray, Laura; "Nonlinear Tire Force Estimation and Road Friction Identification: Simulation and Experiments"; Automatica, vol. 33, No. 10, pp. 1819-1833; 1997.
Italian Search Report, IO 58761 (IT UB20153706), dated May 25, 2016, 8 pages.
Italian Search Report, IO 58837 (IT UB20153709), dated May 31, 2016, 7 pages.
International Search Report and Written Opinion; International Application No. PCT/EP2017/054455, filed on Feb. 27, 2017; dated May 3, 2017, 9 pages.
Italian Search Report and Written Opinion for Application No. IT201900015839, dated Apr. 21, 2020, in 6 pages.
Written Opinion of PCT Application No. PCT/EP2022/059702, in 5 pages.

* cited by examiner

METHODS AND DEVICES FOR ESTIMATING RESIDUAL TORQUE BETWEEN THE BRAKED AND BRAKING ELEMENTS OF A VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

DESCRIPTION

The application relates to devices and methods for detecting residual braking torque, e.g., in a vehicle.

SUMMARY

Residual braking torque is the braking torque, often having relatively small values, in a vehicle due to the unintended interaction between the brake pad and the disc while the vehicle is not actually braking.

This condition can be caused by abnormal operation of the brake caliper to maintain a residual contact between the disc and the pad after braking.

The persistence of this contact condition, although typically small, can maintain a nearly constant residual braking torque that has a considerable effect on fuel consumption and brake pad wear over the long term.

EU6 715/2007/EC standards on $CO_2$ emissions establish significantly more stringent limits on emissions, forcing vehicle manufacturers to seek innovative solutions to reduce them.

Embodiments described herein are configured to limit, measure, estimate, and/or prevent residual braking torque, e.g., to reduce fuel consumption, and thus, the resulting emissions of the vehicle.

The present application describes devices and methods that can estimate residual braking torque in a vehicle due to undesirable interactions between the brake pad and the disc (or drum), e.g., for each brake pad.

Disclosed devices and methods can enable real-time estimates of residual braking torque.

Disclosed devices and methods enable estimates of residual braking torque that can detect the minimum clearance between the brake pads and the disc, to help reduce brake delays.

Disclosed devices and methods can estimate residual braking torque in a manner compatible with on-board installations and applications.

According to additional disclosed embodiments, devices and methods can estimate residual braking torque in a manner compatible with on-board installations and applications, e.g., connecting a means of connection and a means of recording to a remotely controlled system.

According to additional embodiments, disclosed devices and methods use a method to estimate the residual torque between the braking (e.g., brake pad including friction material and/or support plate) and braked elements (e.g., brake disc or drum) of a vehicle.

According to certain aspects, the method can be implemented in whole or in part by one or more computing devices (e.g., an electronic control unit of a vehicle comprising one or more computer hardware processors). The method can include. acquiring the temperature value of said braking element. The method can further include determining whether this brake is activated when the temperature value is acquired. The method can further include accepting the acquired temperature value if said brake is not activated at said acquisition time. If the acquired temperature value is accepted, the method can include automatically calculating a reference temperature using input from an N-dimensional calculation model with an N-dimensional vector of input variables. The N-dimensional vector of variables can include at least the acquired temperature of said braking element. The N-dimensional calculation model can be an analytical or experimental characterization of the thermal behavior of the brake. The method can include estimating residual torque by comparing the accepted acquired temperature to the calculated reference temperature.

Depending on the embodiment, the N-dimensional vector of variables can include at a speed of the vehicle, at least an ambient temperature, at least a time delay between the instant of temperature acquisition and the last instant in which the brake was activated, or any combination The braking element can include a braking disc or drum and said braking element can includes a wearable block of friction material and a back support plate for the friction material block. The temperature of the braking element can be acquired by at least one temperature sensor configured and positioned to detect the temperature of the back support plate.

The method can include using a temporal acquisition logic to acquire the temperature of the braking element based on a sampling frequency for at least one preset time interval. According to further embodiments, the method can include using a temporal acquisition logic to acquire the temperature of the braking element based on continuous sampling for at least one preset time interval starting from an acquisition instant determined by an event.

Depending on the embodiment, at least one variable chosen from vehicle speed, temperature of the braking element, temporal variation of the temperature of the braking element, or brake pedal status can used to determine whether said brake is activated at the instant of temperature value acquisition.

According to certain embodiments, the residual torque can be estimated with the N-dimensional calculation model and, in addition, with an acquired change in brake temperature over time. According to addition aspects, a device or system for estimating the residual braking torque of a vehicle can include a braked element that includes a braking disc or drum. The device can further Include a braking element that includes a block of friction material and a back support plate for said friction material block. The device can further include at least one temperature sensor configured and positioned to detect the temperature of said back support plate. The device can further include an electronic control unit (e.g., a computing device comprising one or more computer hardware processors) connected to said temperature sensor, with said electronic control unit implementing an N-dimensional calculation model that represents an analytical or experimental characterization of the brake's thermal behavior. The electronic control unit (ECU) being programmed (e.g., with software or firmware stored in a memory of the electronic control unit) to acquire the temperature value of said back support plate from said temperature sensor. The ECU can be programmed to determine whether this brake is activated when the temperature value is acquired. The ECU can be programmed to accept the temperature value if said brake is not activated at said acquisition time. The ECU can be programmed, if the temperature value is accepted, to automatically calculate a temperature reference value by providing an N-dimensional vector of variables. The N-dimensional vector of variables can include at least the acquired temperature of said back support plate, as input to said N-dimensional calculation model. The ECU can be programmed to estimate residual torque by comparing the accepted acquired temperature to the calculated reference temperature.

The temperature sensor can be a contact temperature sensor integrated into said back support plate. In some embodiments, the temperature sensor can be a non-contact temperature sensor.

The temperature sensor can be configured and positioned to detect the surface or internal temperature of the support plate.

BRIEF DESCRIPTION OF THE DRAWINGS

Various embodiments are represented in the drawings included in attachment hereto for illustrative purposes, and the scope of this illustration is not in any way to be interpreted as limiting.

Various characteristics of the different embodiments being disclosed may be combined to create additional embodiments, all of which are considered part of this illustration.

DETAILED DESCRIPTION OF CERTAIN EMBODIMENTS

Figure 1:
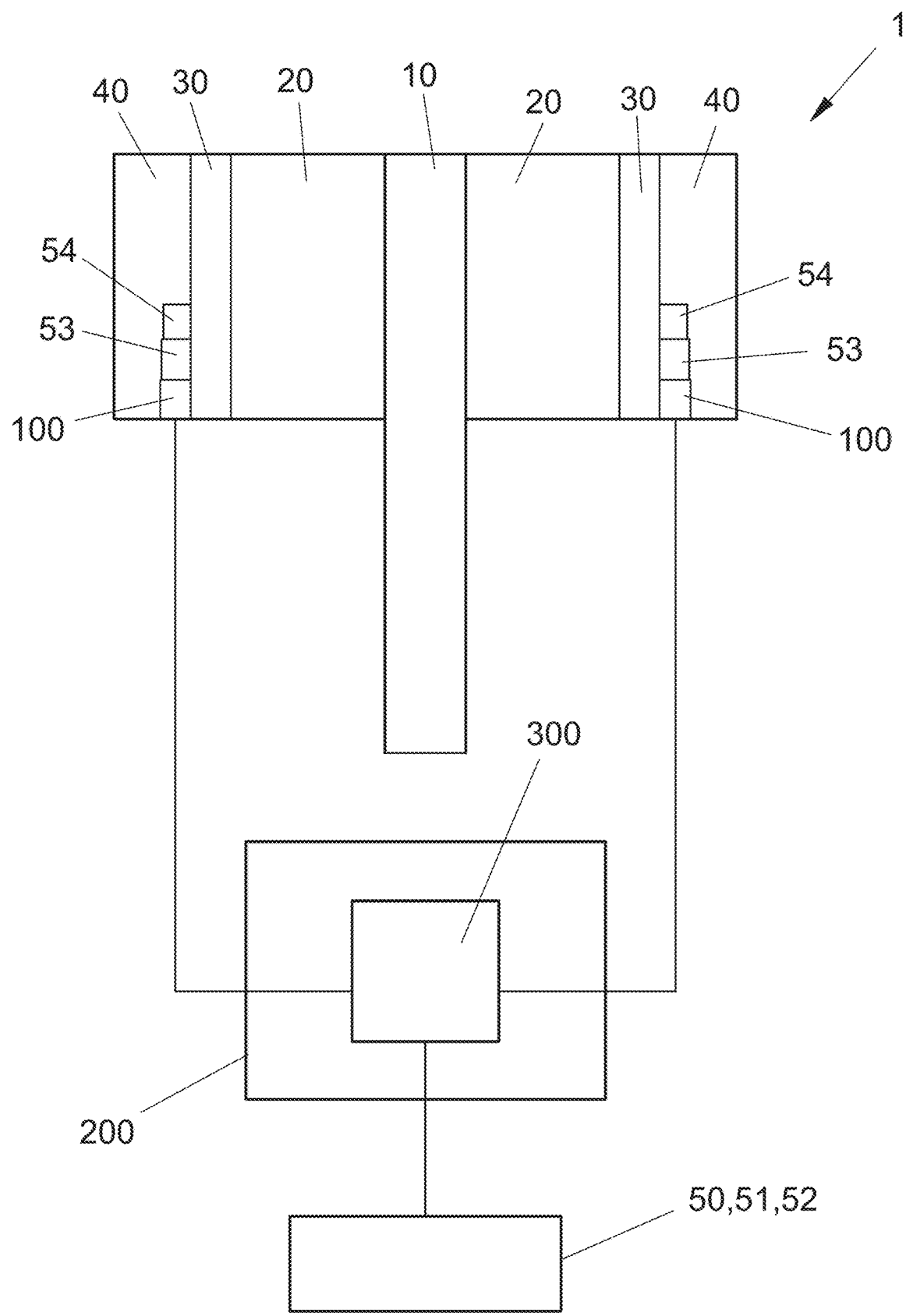
FIG. 1 shows a schematic diagram for a corner of a vehicle equipped with the components for estimating residual torque.

The following detailed description makes reference to the attached drawings, which form part of this description. In the drawings, similar reference numbers typically identify similar components, unless otherwise dictated by the context. The sequence and forms of execution described in the detailed description and drawings are not intended to be limiting. While in some drawings the components for only one corner of the vehicle are illustrated, the characteristics of which should be understood as being applicable to all corners. Other embodiments may be used, and other changes may be made without deviating from the spirit or scope of the subject-matter presented herein. The aspects of this illustration, as described generally herein and illustrated in the figures, may be arranged, replaced, combined, separated and designed in a wide variety of different configurations, all of which are explicitly contemplated and presented in this illustration.

According to certain embodiments, as schematically illustrated in FIG. 1, a vehicle corner 1 (e.g., a portion of a vehicle including one of the wheels of the vehicle and the corresponding brake) comprises a system equipped with brake disc 10, friction material block 20, back support plate 40, optional rear layer 30 between the friction material block 20 and back support plate 40, and temperature sensor 100, configured and positioned to acquire the temperature of back support plate 40.

Temperature sensor 100 can comprise a contact temperature sensor integrated into back support plate 40, or a non-contact temperature sensor. Additionally, temperature sensor 100 may be configured and positioned to detect the surface temperature of back support plate 40 or the average temperature of back support plate 40. For example, temperature sensor 100 may be positioned on the back support plate 40 surface facing friction material block 20. Temperature sensor 100 may be positioned on back support plate 40 and positioned flush with the back support plate 40 surface facing friction material block 20. If the surface temperature of back support plate 40 is to be detected, however, then this surface may be a back support plate 40 surface facing towards or away from the block of friction material 20.

Temperature sensor 100 may comprise a separate component or may be silk-screened, and, e.g., printed directly onto the metal back support plate; different arrangements can be made by combining different types of sensors; multiple temperature sensors may be used for distributed temperature monitoring.

The braking element may comprise a brake pad that coordinates with a braking element represented by disc 10, as illustrated by way of example in FIG. 1, or another type of braking element such as a clamping jaw that coordinates with a drum.

The device for estimating residual torque can include electronic control unit (ECU) 200, which is connected to temperature sensor 100.

The method for estimating the residual torque of a vehicle braking element according to this embodiment provides for temperature sensors 100 to acquire the temperature detected on back support plate 40, generate the temperature signals, and transmit the temperature signals to electronic control unit (ECU) 200.

The electronic control unit (ECU) 200 can also be connected to and receives input signals from a number of auxiliary sensors on board the vehicle. In the illustrated embodiment, the auxiliary sensors include one or more sensors chosen from vehicle speed sensor 50, ambient temperature sensor 51, and brake pedal activation sensor 52.

Vehicle speed detection and the recording of ambient temperature, the temperature for the corner of the vehicle where the braking device is operating, can refine the algorithm's performance and resolution.

In addition, other sensors may be incorporated into the brake pad and connected to electronic control unit (ECU) 200.

The sensors embedded in the brake pad may include one or more sensors chosen between shear strain sensor 53 and pressure force sensor 54.

According to the illustrated embodiment, the ECU 200 executes a calculation algorithm 300. For example, the calculation algorithm 300 can execute to cause the ECU 200 to perform operations to implement or oversee the data collection, control and output of electronic control unit (ECU) 200, e.g., in calculating or estimating residual torque. For example, the ECU 200 can comprise a computing system having one or more computer hardware processors (e.g., central processing units [CPUs]) and memory storing instructions (e.g., software or firmware) which, when executed by the ECU 200 implement the calculation algorithm 300.

According to certain embodiments, one or more of the signals for the variables detected by the auxiliary sensors are used to accept the temperature value acquired by temperature sensor 100 and are also configured, together with the acquired and accepted temperature value, into an N-dimensional array input to an N-dimensional model of the calculation algorithm 300.

The N-dimensional model can generate a reference temperature. The ECU 200 or other appropriate component can estimate residual torque by comparing the acquired and accepted temperature to the calculated reference temperature.

The N-dimensional calculation model can comprise an analytical or experimental characterization of the thermal behavior of the brake.

For example, the N-dimensional calculation model can be represented by the brake's thermal energy storage equation, where the thermal output energy, which equals the thermal energy lost by radiation, conduction, and convection, is equal to the incoming thermal energy generated by the friction of contact between the braking and braked elements of the brake.

The reference temperature, therefore, can be calculated by feeding the equation with the N-dimensional input array, which can also include a residual pressure or residual brake-through-torque value between the braking and braked elements, which can be assumed to have generated the reference temperature.

To estimate the residual torque with multiple identification levels, the calculation may be repeated with different residual pressure values or residual brake-through-torque values, which will correspond to different reference temperature values.

Figure 7:
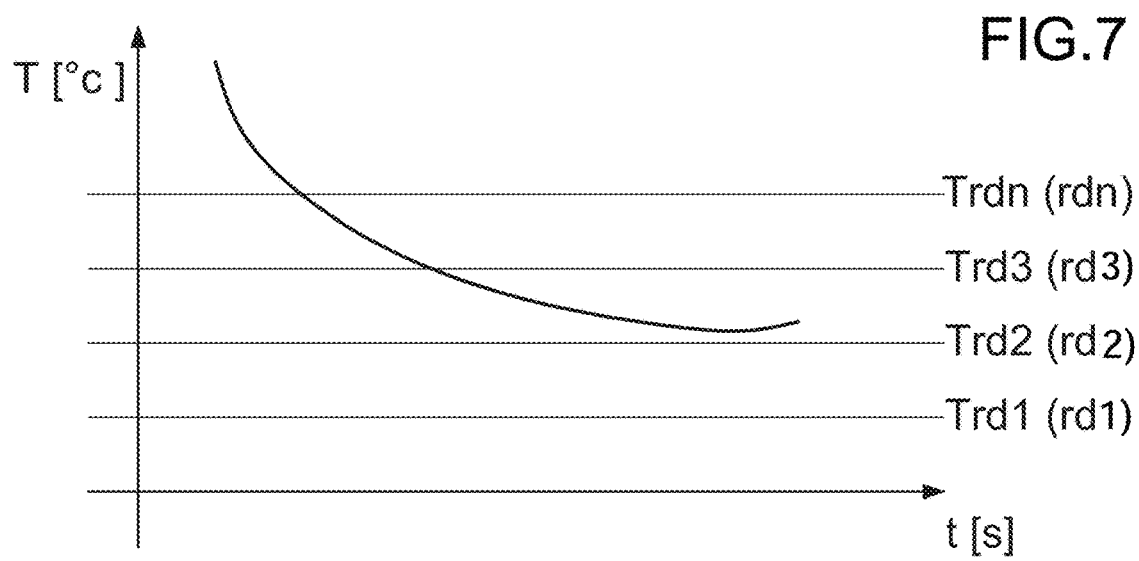
FIG. 7 a plot showing a comparative example for the estimation of residual torque.

FIG. 7, for example, shows the trend over time for the acquired temperature T, and various values calculated for reference temperature $T_{rd1}$, $T_{rd2}$, $T_{rd3}$, and $T_{rdn}$.

Through a calibration curve, for example, each $T_{rd1}$, $T_{rd2}$, $T_{rd3}$, and $T_{rdn}$ is associated with a corresponding residual torque value rd1, rd2, rd3, and rdn.

The comparison between the acquired temperature T and the calculated reference temperature values $T_{rd1}$, $T_{rd2}$, $T_{rd3}$, and $T_{rdn}$ can be used to estimate the residual torque value. For example, in the example shown in FIG. 7 the comparison between the acquired temperature T and the calculated reference temperature values $T_{rd1}$, $T_{rd2}$, $T_{rd3}$, and $T_{rdn}$ can be used to estimate the residual torque value between rd2 and rd3. For example, as the acquired temperature stabilizes in a temperature range corresponding to reference temperature values between $T_{rd2}$ and $T_{rd3}$, a corresponding residual torque between rd2 and rd3 can be determined from the calibration curve.

According to certain embodiments, each corner of the vehicle may be equipped with one or two brake pads, with or without the sensors described above.

According to certain embodiments, the residual torque calculation may be estimated by a single electronic control unit (ECU) for supervision and control, or by individual electronic control units (ECU) dedicated to each corner of the vehicle.

According to certain embodiments, the residual torque calculation may be estimated in real time.

According to certain embodiments, the acquisition and control algorithms may be independent of vehicle type and/or braking pad and/or driving style, thanks to a self-assessment of the calibration of the signal threshold: therefore, according to certain embodiment, no tuning operations are necessary for the different applications.

Depending on the embodiment, the data capture may be based on two different strategies: a time-based strategy, or an event-based strategy.

According to certain embodiments, the residual torque estimate, e.g., the technique used to estimate the residual torque, is independent of the data acquisition strategy.

Figure 2A:
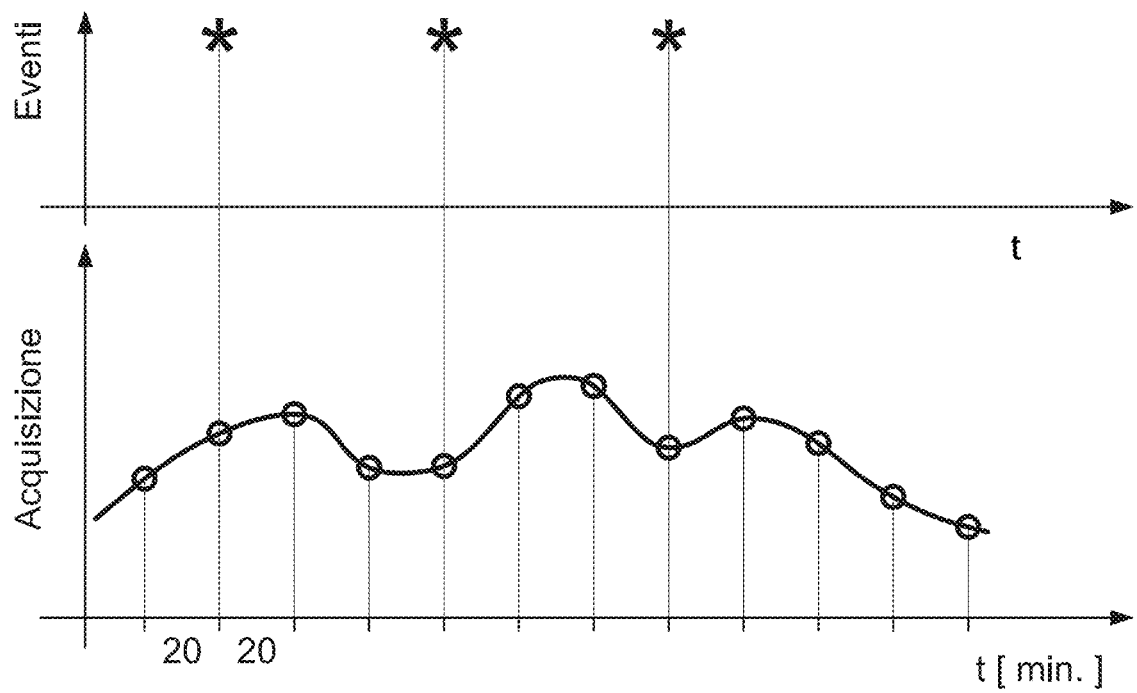
FIG. 2A shows a plot of a time-based data acquisition strategy.

FIG. 2A shows a time-based data acquisition strategy. For example, the time-based acquisition of the braking element temperature can be based on a sampling frequency established over at least one time interval. The data acquisition can be synchronous with preset and constant acquisition periods, e.g., typically from 20 to 60 seconds, and preferably 30 seconds, during the entire operation of the vehicle. For example, the ECU 200 may execute the algorithm 300 to implement the time-based data acquisition strategy.

The acquisition can take place independently of brake pedal activation; activation of the pedal can be recorded.

Figure 2B:
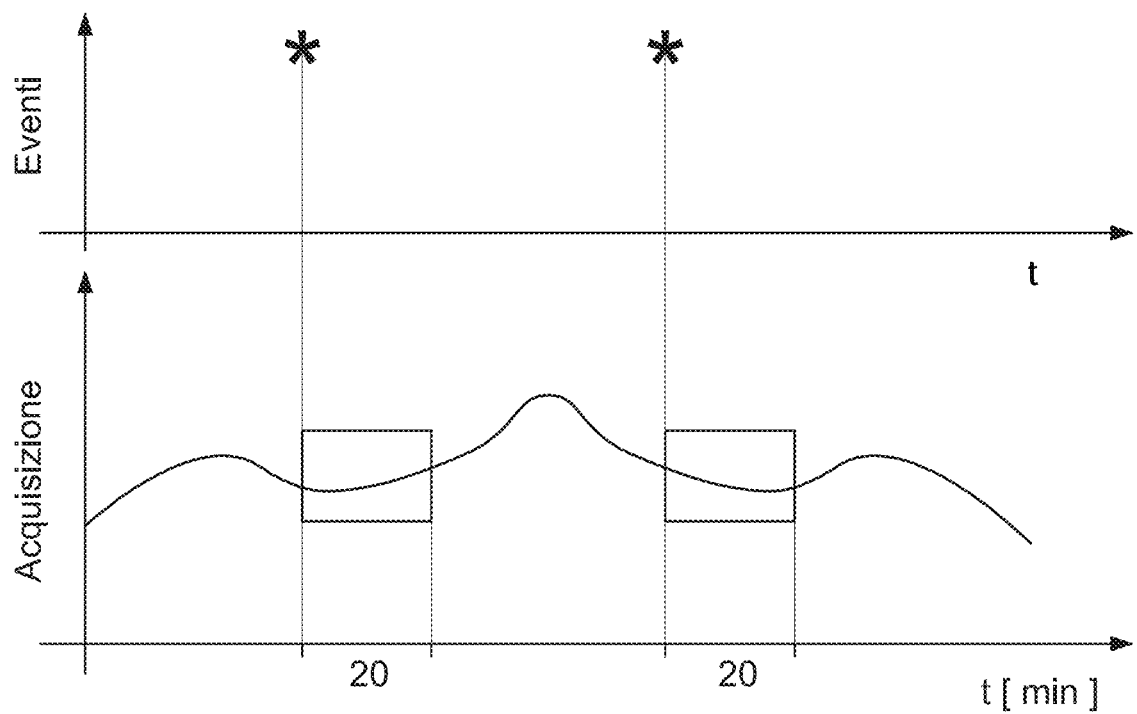
FIG. 2B shows a plot of a data acquisition strategy based on an activation event.

FIG. 2B illustrates a data capture strategy based on a trigger event. For example, temporal acquisition of brake element temperature can be based on continuous sampling capture logic over at least one fixed time interval from the instant of acquisition determined by the triggering of a braking event. For example, the ECU 200 may execute the algorithm 300 to implement this data acquisition strategy.

Activating the brake pedal can trigger the acquisition of data within a subsequent time window, e.g., typically from 10 to 60 minutes, preferably 30 minutes.

The data capture within the time window can happen with preset and constant acquisition periods, e.g., typically from 20 to 60 seconds, preferably 30 seconds.

Any activation of the brake pedal within an already open time window can trigger a subsequent time window starting from the brake pedal activation event.

Figure 3A:
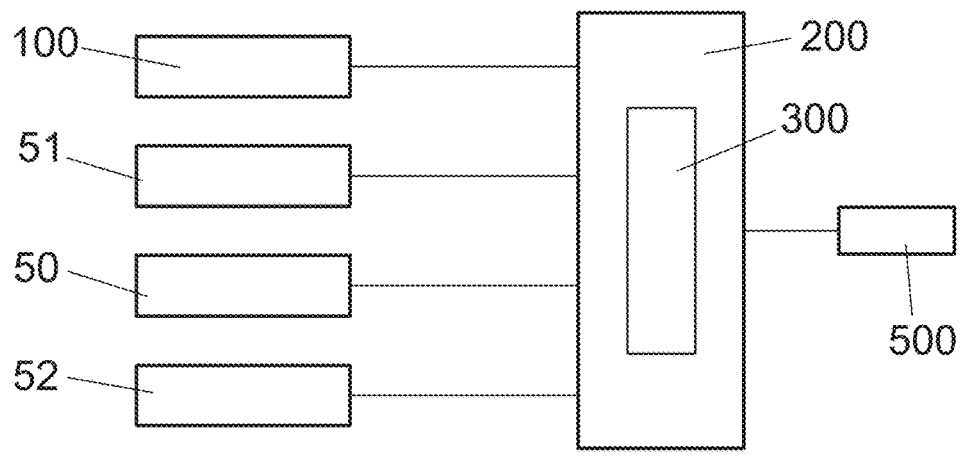
FIGS. 3A, 3B, and 3C illustrate the first configuration of an embodiment of a residual torque estimation method that can be performed by embodiments disclosed herein.
Figure 3B:
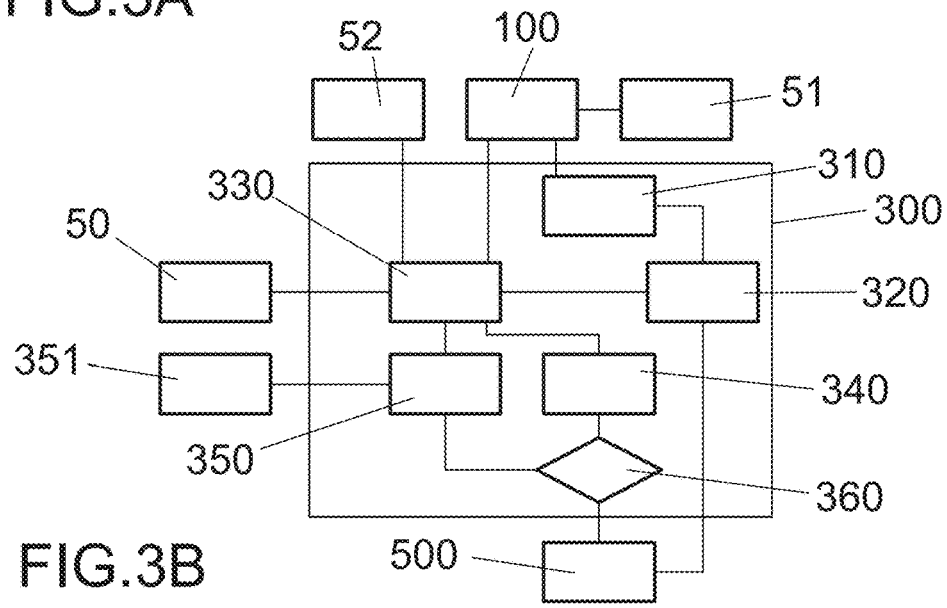
Figure 3C:
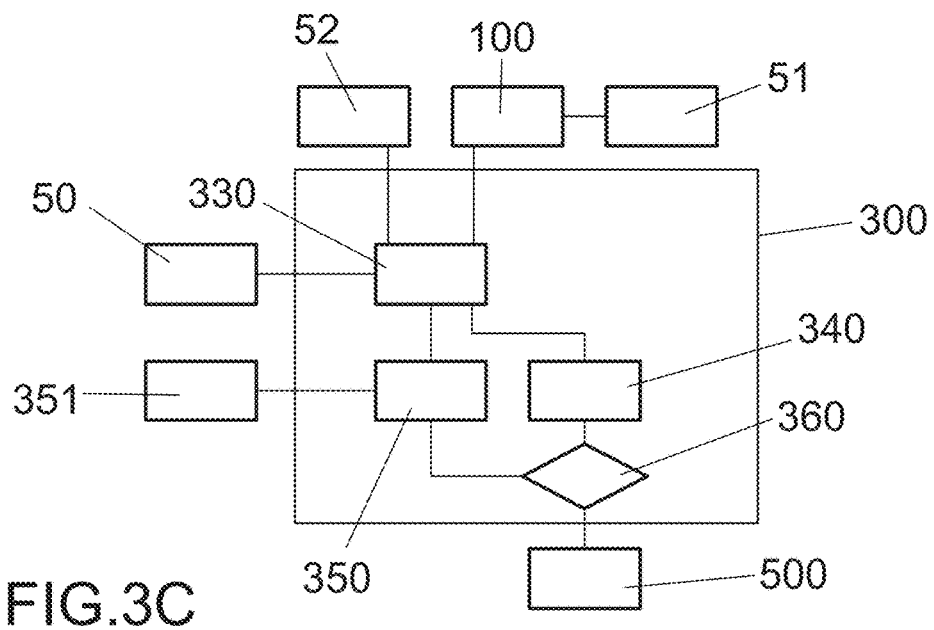

A first configuration of an embodiment of the residual torque estimation system and method according to certain embodiments is illustrated in FIGS. 3A, 3B and 3C.

FIG. 3A schematically illustrates an example of the system.

The system includes at least one temperature sensor 100, ambient temperature sensor 51, speed sensor 50, brake pedal activation sensor 52, and electronic control unit (ECU) 200, which can provide an estimate of residual torque 500 by processing the signals with algorithm 300. For example, the system of FIG. 3A can comprise the system of vehicle corner 1 shown in FIG. 1.

FIG. 3B shows an example of a first logical flow of an example of the residual torque estimation method, e.g., implemented by the algorithm 300 executed on the ECU 200 of the systems of FIG. 1 or FIG. 3A.

The ambient temperature detection in the corner of the vehicle detected by ambient temperature sensor 51 can be used for seasonal calibration of the temperature detected by temperature sensor 100 of back support plate 40 of the brake pad. For example, ECU 200 can adjust or otherwise calibrate the temperature detected by the temperature sensor 100 using the ambient temperature detected by the ambient sensor 51 to calibrate for the ambient temperature.

According to the illustrated embodiment, an initial estimate of residual torque 500 is obtained through calculation section 310, which evaluates the first derivative of the detected temperature over time, and section 320, which processes it based on the braking status, thereby obtains substantially immediate or real-time information, especially for high levels of residual torque.

Calculation section 330 performs temperature selection under non-braking conditions based on the data received from temperature sensor 100, as corrected by ambient temperature sensor 51, from the data processed by calculation section 320, as shown above, from brake pedal activation sensor signal 52, and from the speed detected by vehicle speed sensor 50.

Calculation section 330 filters the temperature that is acquired and accepted in calculation section 340 by using low-pass filters to eliminate high-frequency peaks and components.

Calculation section 330 also generates a variable flag that enables reference temperature evaluation through calculation section 350, using N-dimensional model 351 powered by an N-dimensional vector of organized brake pad temperature data detected by sensor 100, ambient temperature detected by sensor 51, vehicle speed detected by sensor 50 and the time detected relative to the braking event detected by sensor 52.

N-dimensional model 351 may alternatively comprise an analytical model derived from an analytical description of the energy exchanged between the disc and the pad during braking, or an experimental model derived from a set of experimental data collected during a series of dynamic energy exchanges between disc and pad.

Calculation section 350 can calculate the reference temperature by feeding, for example, the equation representing the thermal equilibrium of the brake with the N-dimensional input array, which also includes a residual pressure or residual brake-through-torque value between the braking and braked elements, which are assumed to have generated the reference temperature.

Calculation section 360 receives and compares the selected temperature evaluation signals filtered by calculation section 340 and the reference temperature signal from calculation section 350 and produces and processes a signal for residual torque estimate 500.

This signal is then compared with the signal obtained from calculation section 320.

FIG. 3C shows a second example of a logical flow of an example of the residual torque estimation method, e.g., implemented by the algorithm 300 executed on the ECU 200 of the systems of FIG. 1 or FIG. 3A.

This second logical flow differs from the first, as described above and illustrated in FIG. 3B, due to the lack of activation of calculation sections 310 and 320. Rather, the signal for residual torque estimate 500 is simply the signal obtained from calculation section 360.

Figure 4A:
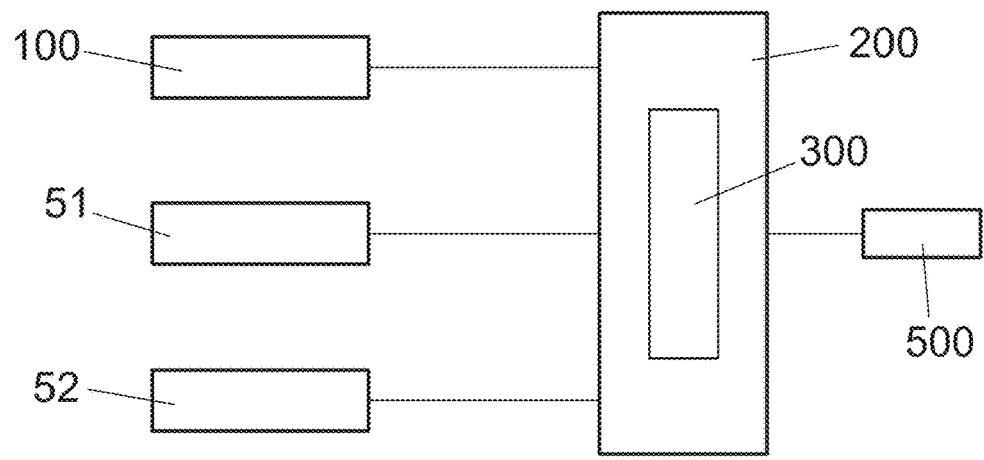
FIGS. 4A, 4B, and 4C illustrate a second configuration of an embodiment of a residual torque estimation method that can be performed by embodiments disclosed herein.
Figure 4B:
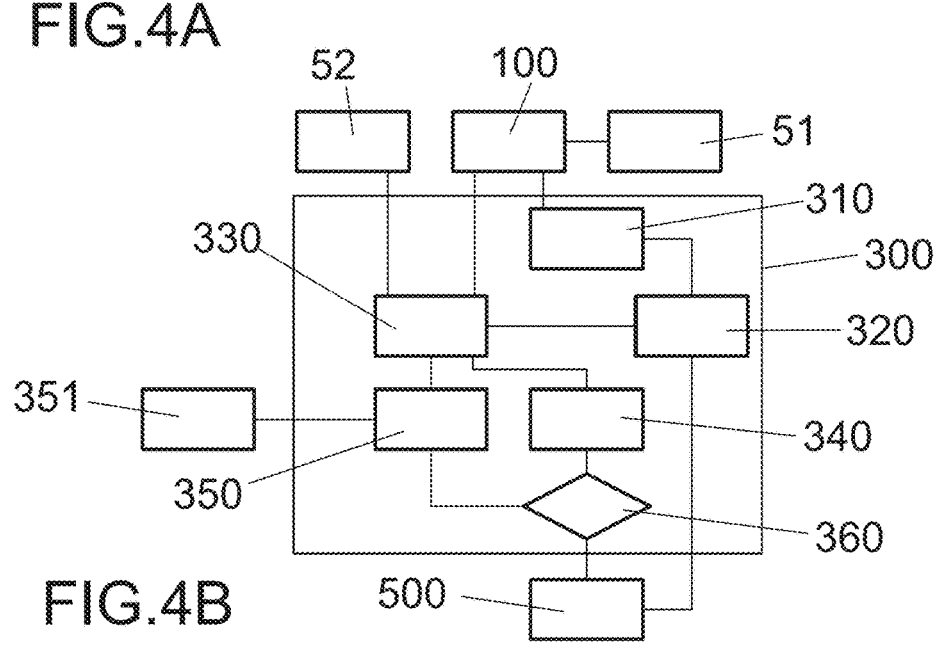
Figure 4C:
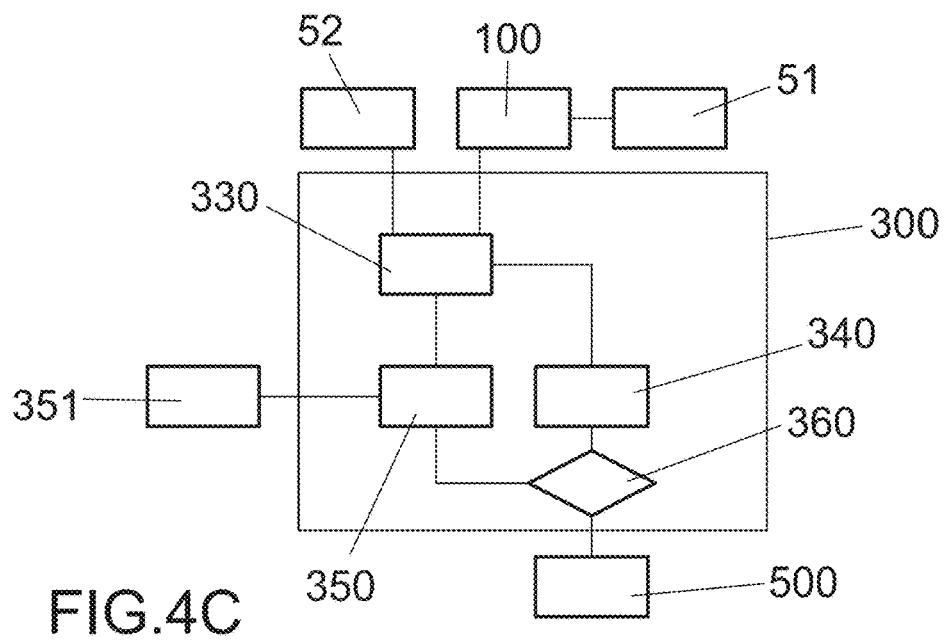

FIGS. 4A, 4B, and 4C show a second configuration of certain embodiments of a residual torque estimation system and method.

FIG. 4A schematically illustrates the system's architectural configuration.

The architecture includes at least one temperature sensor 100, ambient temperature sensor 51, brake pedal activation sensor 52, and electronic control unit (ECU) 200, which provides an estimate of residual torque 500 by processing signals through algorithm 300.

The architecture of the second configuration differs from the first configuration shown in FIG. 3A due to the lack of speed data acquisition from vehicle speed sensor 50. For example, the system of FIG. 4A can comprise the system of vehicle corner 1 shown in FIG. 1, but without the vehicle speed sensor 50.

FIG. 4B shows an example of a first logical flow of a residual torque estimation method, e.g., implemented by the algorithm 300 executed on the ECU 200 of the systems of FIG. 1 or FIG. 4A.

The ambient temperature detection in the corner of the vehicle detected by ambient temperature sensor 51 can be used for seasonal calibration of the temperature detected by temperature sensor 100 of back support plate 40 of the brake pad. For example, ECU 200 can adjust or otherwise calibrate the temperature detected by the temperature sensor 100 using the ambient temperature detected by the ambient sensor 51 to calibrate for the ambient temperature.

According to the illustrated embodiment, an initial estimate of residual torque 500 is obtained through calculation section 310, which evaluates the first derivative of the detected temperature over time, and section 320, which processes it based on the braking status: this obtains immediate information, especially for high levels of residual torque.

Calculation section 330 performs temperature selection under non-braking conditions based on the data received from temperature sensor 100, as corrected by ambient temperature sensor 51, from the data processed by calculation section 320, as shown above, from brake pedal activation sensor signal 52.

Calculation section 330 filters the temperature that is acquired and accepted in calculation section 340 by using low-pass filters to eliminate high-frequency peaks and components.

Calculation section 330 also generates a variable flag that enables reference temperature evaluation through calculation section 350, using N-dimensional model 351 powered by an N-dimensional vector of organized brake pad temperature data detected by sensor 100, ambient temperature detected by sensor 51, and the time detected relative to the braking event detected by sensor 52.

Calculation section 360 receives and compares the selected temperature evaluation signals filtered by calculation section 340 and the reference temperature signal from calculation section 350 and produces and processes a signal for residual torque estimate 500.

This signal is then compared with the signal obtained from calculation section 320.

FIG. 4C shows a second example of a logical flow of an example of the residual torque estimation method based on a second configuration of the preferred embodiment, e.g., implemented by the algorithm 300 executed on the ECU 200 of the systems of FIG. 1 or FIG. 3A.

This second logical flow differs from the first, as described above and illustrated in FIG. 4B, due to the lack of activation of calculation sections 310 and 320. Rather, the signal for residual torque estimate 500 is simply the signal obtained from calculation section 360.

Figure 5A:
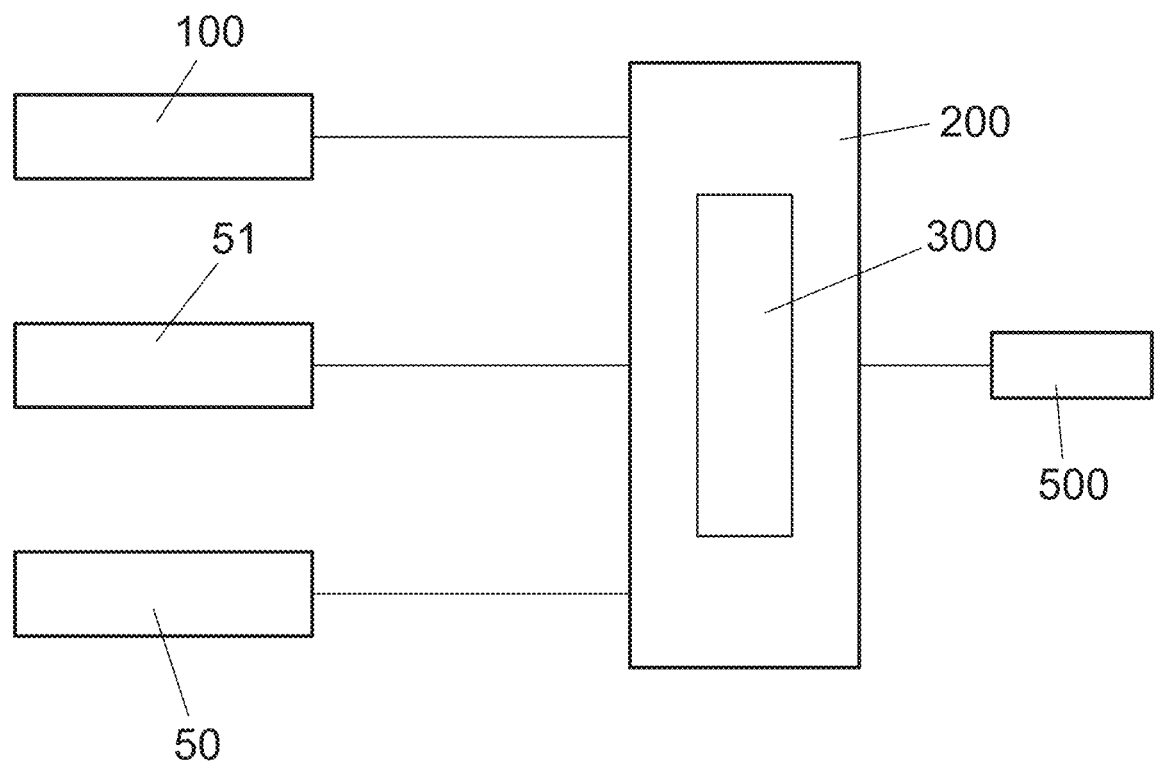
FIGS. 5A and 5B illustrate a third configuration of an embodiment of a residual torque estimation method that can be performed by embodiments disclosed herein.
Figure 5B:
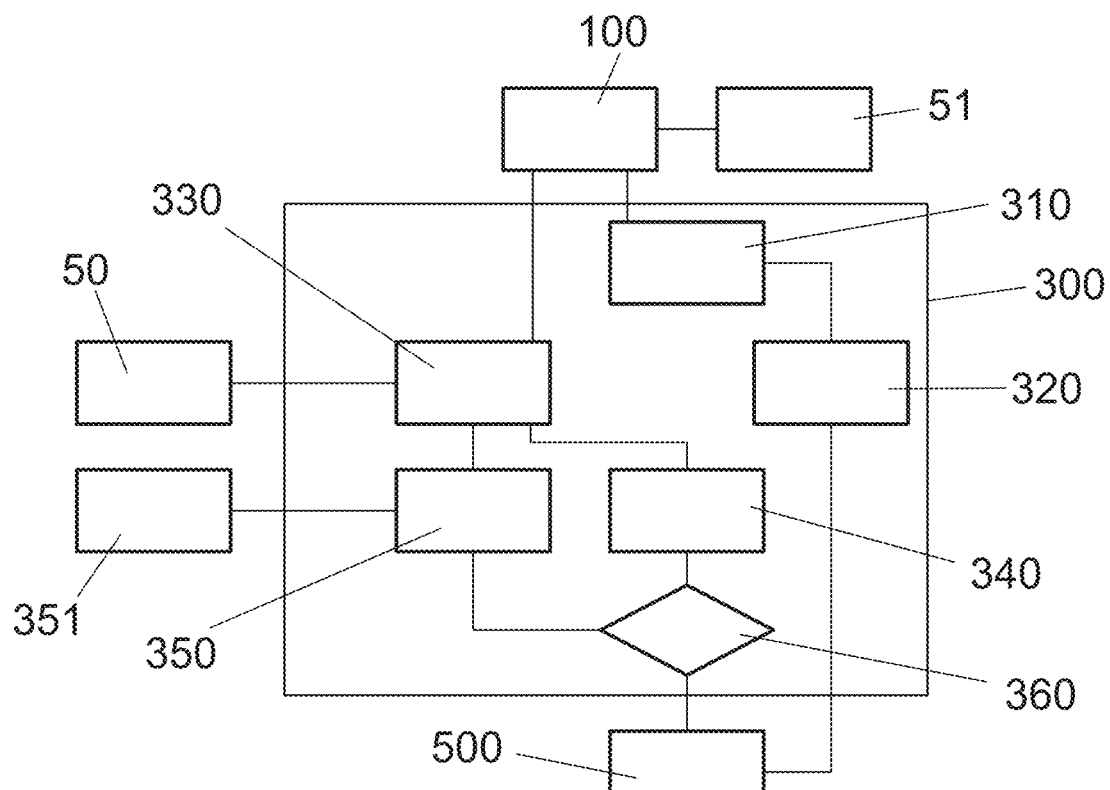

FIGS. 5A and 5B illustrate a third configuration of certain embodiments of a residual torque estimation system and method.

The third configuration differs from the first configuration shown in FIG. 3A due to the lack of brake pedal activation data acquisition from sensor 52. For example, the system of FIG. 5A can comprise the system of vehicle corner 1 shown in FIG. 1, but without the pedal activation sensor 52.

FIG. 5B shows an example of a first logical flow of a residual torque estimation method, e.g., implemented by the algorithm 300 executed on the ECU 200 of the systems of FIG. 1 or FIG. 5A.

The ambient temperature detection in the corner of the vehicle detected by ambient temperature sensor 51 can be used for seasonal calibration of the temperature detected by temperature sensor 100 of back support plate 40 of the brake pad. For example, ECU 200 can adjust or otherwise calibrate the temperature detected by the temperature sensor 100 using the ambient temperature detected by the ambient sensor 51 to calibrate for the ambient temperature.

According to the illustrated embodiment, an initial estimate of residual torque 500 is obtained through calculation section 310, which evaluates the first derivative of the detected temperature over time, and section 320, which processes it based on the braking status: this obtains immediate information, especially for high levels of residual torque.

One variant of the embodiment does not include calculation section 310.

Calculation section 330 performs temperature selection under non-braking conditions based on the data received from temperature sensor 100, as corrected by ambient temperature sensor 51, from the data processed by calculation section 320, as shown above, from the signal from vehicle speed sensor 50.

Calculation section 330 filters the temperature that is acquired and accepted in calculation section 340 by using low-pass filters to eliminate high-frequency peaks and components.

Calculation section 330 also generates a variable flag that enables reference temperature evaluation through calculation section 350, using N-dimensional model 351 powered by an N-dimensional vector of organized brake pad temperature data detected by sensor 100, ambient temperature detected by sensor 51, and vehicle speed detected by sensor 50.

Calculation section 360 receives and compares the selected temperature evaluation signals filtered by calculation section 340 and the reference temperature signal from calculation section 350 and produces and processes a signal for residual torque estimate 500.

This signal is then compared with the signal obtained from calculation section 320.

Figure 6A:
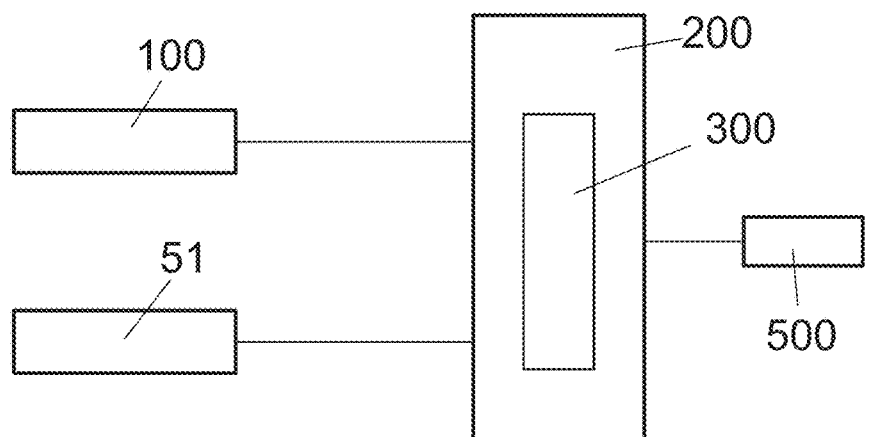
FIGS. 6A and 6B illustrate a fourth configuration of an embodiment of a residual torque estimation method that can be performed by embodiments disclosed herein.
Figure 6B:
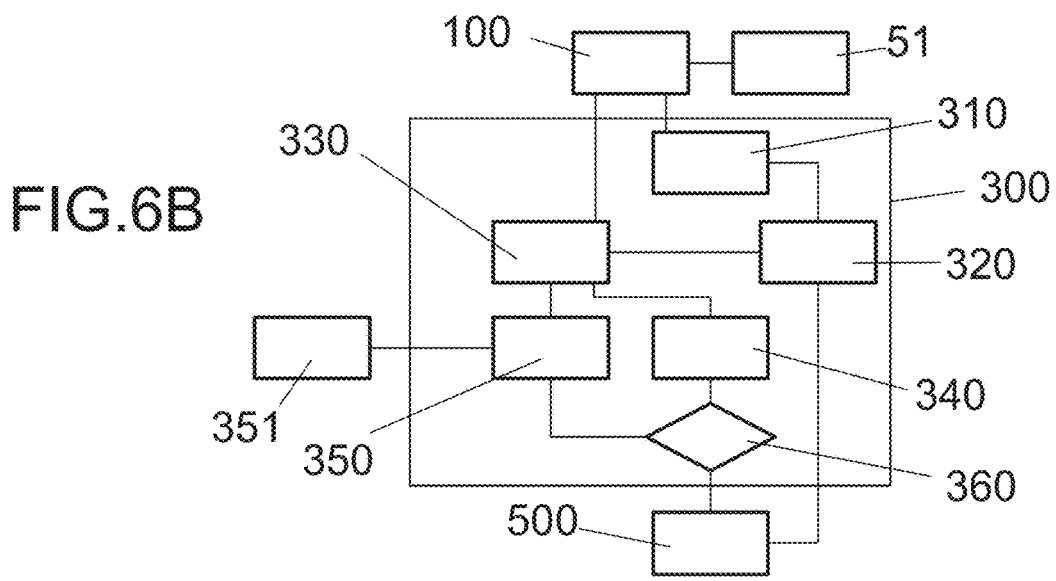

FIGS. 6A and 6B illustrate a fourth configuration of a preferred embodiment of the residual torque estimation method.

FIG. 6A schematically illustrates the system's architectural configuration.

The architecture of the fourth configuration differs from the first configuration shown in FIG. 3A due to the lack of brake pedal activation data acquisition from sensor 52 and the speed data from vehicle speed sensor 50. For example, the system of FIG. 6A can comprise the system of vehicle corner 1 shown in FIG. 1, but without the vehicle speed sensor 50 or pedal activation sensor 52.

FIG. 6B shows an example of a logical flow of a residual torque estimation method based on a fourth configuration of the preferred embodiment, e.g., implemented by the algorithm 300 executed on the ECU 200 of the systems of FIG. 1 or FIG. 6A.

The ambient temperature detection in the corner of the vehicle detected by ambient temperature sensor 51 can be used for seasonal calibration of the temperature detected by temperature sensor 100 of back support plate 40 of the brake pad. For example, ECU 200 can adjust or otherwise calibrate the temperature detected by the temperature sensor 100 using the ambient temperature detected by the ambient sensor 51 to calibrate for the ambient temperature.

According to the illustrated embodiment, an initial estimate of residual torque 500 is obtained through calculation section 310, which evaluates the first derivative of the detected temperature over time, and section 320, which processes it based on the braking status: this obtains immediate information, especially for high levels of residual torque.

One variant of the embodiment does not include calculation section 310.

Calculation section 330 performs temperature selection under non-braking conditions based on the data received from temperature sensor 100, as corrected by ambient temperature sensor 51, from the data processed by calculation section 320, as shown above.

Calculation section 330 filters the temperature that is acquired and accepted in calculation section 340 by using low-pass filters to eliminate high-frequency peaks and components.

Calculation section 330 also generates a variable flag that enables reference temperature evaluation through calculation section 350, using N-dimensional model 351 powered by an N-dimensional vector of organized brake pad temperature data detected by sensor 100, and ambient temperature detected by sensor 51.

Calculation section 360 receives and compares the selected temperature evaluation signals filtered by calculation section 340 and the reference temperature signal from calculation section 350 and produces and processes a signal for residual torque estimate 500.

This signal is then compared with the signal obtained from calculation section 320.

Other changes and variations to the method and the device for estimating the residual torque of a vehicle brake element are possible.

The disclosed methods and systems for estimating the residual torque of a vehicle brake element can be subject to changes and variants while still falling within the scope of the inventions described herein, including equivalents.

For example, any type of appropriate materials and systems may be used.

Although certain devices, systems, and processes have been disclosed in the context of certain example embodiments, it will be understood by those skilled in the art that the scope of this disclosure extends beyond the specifically disclosed embodiments to other alternative embodiments and/or uses of the embodiments and certain modifications and equivalents thereof. Use with any structure is expressly within the scope of this present disclosure. Various features and aspects of the disclosed embodiments can be combined with or substituted for one another in order to form varying modes of the assembly. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Terms of orientation used herein, such as "top," "bottom," "proximal," "distal," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Some embodiments have been described in connection with the accompanying drawings. The figures are to scale, but such scale should not be limiting, since dimensions and proportions other than what are shown are contemplated and are within the scope of the disclosed present disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

Various illustrative embodiments of devices, systems, and methods have been disclosed. Although the devices, systems, and methods have been disclosed in the context of those embodiments, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A method for estimating a residual torque in a brake of a vehicle, the method comprising:
    acquiring a temperature of a braking element of the brake;
    determining that the brake is not activated at an acquisition time of the acquiring of the temperature;
    calculating a reference temperature using an N-dimensional calculation model with an N-dimensional vector of input variables; and
    estimating residual torque based on at least the calculated reference temperature,
    wherein the N-dimensional vector of input variables includes at least the acquired temperature of the braking element, and
    wherein the N-dimensional calculation model comprises an analytical or experimental characterization of thermal behavior of the brake.

2. The method of claim 1 wherein the estimating comprises comparing the acquired temperature to the calculated reference temperature.

3. The method of claim 1, wherein the N-dimensional vector of input variables further comprises at least a speed of the vehicle.

4. The method of claim 1, wherein the N-dimensional vector of input variables further comprises at least an ambient temperature.

5. The method of claim 1, wherein the N-dimensional vector of variables further comprises at least a time delay between a time of the temperature acquisition and a last time in which the brake was activated.

6. The method of claim 1, wherein the braking element comprises a braking disc, a block of friction material, and a support plate supporting the block of friction material, wherein the temperature of the braking element is acquired by at least one temperature sensor configured and positioned to detect the temperature of the support plate.

7. The method of claim 1, wherein said acquiring the temperature of the braking element comprises sampling according to temporal acquisition logic based on a sampling frequency for at least one preset time interval.

8. The method of claim 1, wherein said acquiring the temperature of the braking element comprises continuously sampling for at least one preset time interval starting at a time determined by an event.

9. The method of claim 1, wherein the determining that the brake is not activated at the acquisition time of the acquiring of the temperature comprises using at least one of vehicle speed, temperature of the braking element, temporal variation of the temperature of the braking element, or brake pedal status.

10. The method of claim 1, wherein the estimating of the residual torque is additionally based on a change in brake temperature over time.

11. A system for estimating residual braking torque of a braking element of a vehicle brake, the system comprising:
    a braking element comprising a block of friction material and a support plate supporting the block of friction;
    at least one temperature sensor configured and positioned to detect the temperature of the braking element;

a computing device comprising connected to the temperature sensor, the computing device programmed to:
- acquire a temperature associated with the braking element from the temperature sensor;
- determine that the brake is not activated at an acquisition time at which the temperature is acquired;
- calculate a reference temperature using an N-dimensional calculation model with an N-dimensional vector of input variables, wherein the calculation is based on at least the acquired temperature of the braking element as an input to said N-dimensional calculation model; and
- estimate a residual torque based on at least the calculated reference temperature.

12. The system of claim 11, wherein the estimation of the residual torque is based on a comparison of the acquired temperature to the calculated reference temperature.

13. The system of claim 11, wherein the N-dimensional calculation model represents an analytical or experimental characterization of a thermal behavior of the brake.

14. The system of claim 11, wherein the temperature sensor is a contact temperature sensor integrated into the support plate.

15. The system of claim 11, wherein the temperature sensor is a non-contact temperature sensor.

16. The system of claim 11, wherein the temperature sensor is configured and positioned to detect a surface or internal temperature of the support plate.

17. The system of claim 11, wherein the computing device is programmed to acquire the temperature associated with the braking element by sampling according to temporal acquisition logic based on a sampling frequency for at least one preset time interval.

18. The system of claim 11, wherein the computing device is programmed to acquire the temperature of the braking element by continuously sampling for at least one preset time interval starting at a time determined by an event.

19. The system of claim 11, wherein the computing device is programmed to determine that the brake is not activated at the acquisition time using at least one of vehicle speed, temperature of the braking element, temporal variation of the temperature of the braking element, or brake pedal status.

20. The system of claim 11, wherein the computing device is programmed to estimate the residual torque by comparing the acquired temperature to the calculated reference temperature and based on a change in brake temperature over time.

* * * * *